(12) United States Patent
Gorilovsky et al.

(10) Patent No.: US 10,375,382 B2
(45) Date of Patent: Aug. 6, 2019

(54) SYSTEM COMPRISING MULTIPLE DIGITAL CAMERAS VIEWING A LARGE SCENE

(71) Applicants: Dmitry Gorilovsky, Nuremberg (DE); Aleksey Gorilovsky, St. Petersburg (RU)

(72) Inventors: Dmitry Gorilovsky, Nuremberg (DE); Aleksey Gorilovsky, St. Petersburg (RU)

(*) Notice: Subject to any disclaimer, the term of this patent is extended or adjusted under 35 U.S.C. 154(b) by 8 days.

(21) Appl. No.: 15/510,858

(22) PCT Filed: Sep. 15, 2015

(86) PCT No.: PCT/EP2015/071083
§ 371 (c)(1),
(2) Date: Mar. 13, 2017

(87) PCT Pub. No.: WO2016/041953
PCT Pub. Date: Mar. 24, 2016

(65) Prior Publication Data
US 2017/0264890 A1    Sep. 14, 2017

(30) Foreign Application Priority Data

Sep. 15, 2014   (GB) .................................. 1416254.9
Oct. 20, 2014   (GB) .................................. 1418606.8

(51) Int. Cl.
*H04N 13/361*   (2018.01)
*H04N 13/279*   (2018.01)
(Continued)

(52) U.S. Cl.
CPC ......... *H04N 13/361* (2018.05); *B66B 13/303* (2013.01); *G03B 37/04* (2013.01);
(Continued)

(58) Field of Classification Search
CPC ... G01N 2223/414; G06T 15/00; G06T 19/20; G06T 2200/04; G06T 2207/10021;
(Continued)

(56) References Cited

U.S. PATENT DOCUMENTS 5,729,471 A * 3/1998 Jain ..................... H04N 13/139
                                                           725/131
5,850,352 A * 12/1998 Moezzi ............... H04N 13/139
                                                           345/419

(Continued)

FOREIGN PATENT DOCUMENTS

CN     101249914 A    8/2008
CN     103186922 A    7/2013
(Continued)

OTHER PUBLICATIONS

Shirase, Derwent Abstract English translation, 1994 (Year: 1994).*
(Continued)

*Primary Examiner* — Fernando Alcon
(74) *Attorney, Agent, or Firm* — Saul Ewing Arnstein & Lehr LLP

(57) ABSTRACT

Multiple digital cameras view a large scene, such as a part of a city. Some of the cameras view different parts of that scene, and video feeds from the cameras are processed at a computer to generate a photo-realistic synthetic 3D model of the scene. This enables the scene to be viewed from any viewing angle, including angles that the original, real cameras do not occupy—i.e. as though viewed from a 'virtual camera' that can be positioned in any arbitrary position. The 3D model combines both static elements that do not alter in real-time, and also dynamic elements that do alter in real-time or near real-time.

22 Claims, 8 Drawing Sheets

(51) Int. Cl.
*H04N 13/296* (2018.01)
*H04N 13/243* (2018.01)
*H04N 5/247* (2006.01)
*H04N 5/232* (2006.01)
*G06T 15/20* (2011.01)
*G03B 37/04* (2006.01)
*B66B 13/30* (2006.01)
*H04N 13/00* (2018.01)

(52) U.S. Cl.
CPC ....... *G06T 15/205* (2013.01); *H04N 5/23238* (2013.01); *H04N 5/247* (2013.01); *H04N 13/243* (2018.05); *H04N 13/279* (2018.05); *H04N 13/296* (2018.05); *H04N 2013/0081* (2013.01); *H04N 2013/0085* (2013.01); *H04N 2013/0088* (2013.01); *H04N 2013/0092* (2013.01)

(58) Field of Classification Search
CPC ........ G06T 15/205; G11B 2020/10611; H04N 13/00; H04N 21/8146; H04N 21/816; H04N 31/361; H04N 31/279; H04N 31/296; H04N 31/243; H04N 5/23238; H04N 5/247; B66B 13/303; G03B 37/04
See application file for complete search history.

(56) References Cited

U.S. PATENT DOCUMENTS

| | | | | |
|---|---|---|---|---|
| 6,335,754 | B1 * | 1/2002 | Endo | G01C 11/02 348/36 |
| 6,674,461 | B1 | 1/2004 | Klapman | |
| 6,940,538 | B2 | 9/2005 | Rafey et al. | |
| 9,229,231 | B2 * | 1/2016 | Small | G06F 3/013 |
| 9,323,429 | B2 * | 4/2016 | Lu | G06F 3/017 |
| 2002/0021353 | A1 * | 2/2002 | DeNies | H04N 21/21805 348/36 |
| 2004/0022437 | A1 * | 2/2004 | Beardsley | G06K 9/00362 382/199 |
| 2004/0226777 | A1 * | 11/2004 | Kakko | B66B 3/023 187/391 |
| 2007/0107371 | A1 * | 5/2007 | Plocher | G06T 19/20 52/745.05 |
| 2008/0303746 | A1 * | 12/2008 | Schlottmann | G07F 17/32 345/1.2 |
| 2011/0090344 | A1 * | 4/2011 | Gefen | H04N 5/232 348/169 |
| 2011/0157323 | A1 * | 6/2011 | Chen | G03B 35/18 348/51 |
| 2011/0285704 | A1 * | 11/2011 | Takeda | A63F 13/525 345/419 |
| 2012/0188279 | A1 * | 7/2012 | Demaine | A63F 13/10 345/633 |
| 2012/0314089 | A1 | 12/2012 | Chang et al. | |
| 2013/0083011 | A1 * | 4/2013 | Geisner | G09G 5/00 345/419 |
| 2013/0242060 | A1 * | 9/2013 | Brady | G02B 13/06 348/47 |
| 2014/0045832 | A1 | 1/2014 | Kozko et al. | |
| 2014/0055570 | A1 * | 2/2014 | Dehais | G06T 17/20 348/47 |
| 2016/0330408 | A1 * | 11/2016 | Costanzo | H04L 65/4084 |

FOREIGN PATENT DOCUMENTS

| | | |
|---|---|---|
| JP | 06345370 A * | 12/1994 |
| WO | 02/49356 A2 | 6/2002 |
| WO | 2012/139126 A2 | 10/2012 |

OTHER PUBLICATIONS

John Biggs, "Digigage is a Signage Solution That Turns Your Elevator Into an Aquarium", Mar. 20, 2014, https://techcrunch.com/2014/03/20/digigage-is-a-signage-solution-that-turns-your-elevator-into-an-aquarium/ (Year: 2014).*
International Search Report, dated Feb. 23, 2016, issued in International Application No. PCT/EP2015/071083.
Hansung Kim et al., "A Real-Time 3D Modeling System Using Multiple Stereo Cameras For Free-Viewpoint Video Generation," Image Analysis and Recognition Lecture Notes in Computer Science; LNCS; pp. 237-249 (Jan. 1, 2006), XP019043784.
Cevahir Cigla et al., "Segmentation in multi-view video via color, depth and motion cues," 15th IEEE Intl. Conference on Image Processing: ICIP 2008: Oct. 12-15, 2008, IEEE, pp. 2724-2727 (Oct. 12, 2008) XP031374604.
Papadakis et al., "Virtual Camera Synthesis for Soccer Game Replays," Visual Media Production (CVMP), 2010 Conference on, IEEE, pp. 97-106 (Nov. 17, 2010) XP031853451.

* cited by examiner

SYSTEM COMPRISING MULTIPLE DIGITAL CAMERAS VIEWING A LARGE SCENE

CROSS REFERENCE TO RELATED APPLICATIONS

This application claims the priority of PCT/EP2015/071083, filed on Sep. 15, 2015, which claims the benefit of priority to Great Britain Application Nos. 1416254, filed on Sep. 15, 2014; and 1418606.8, filed on Oct. 20, 2014, the entire contents of each of which are fully incorporated herein by reference.

BACKGROUND OF THE INVENTION

1. Field of the Invention

This invention relates to a system comprising multiple digital cameras viewing a large scene, such as a part of a city. Some of the cameras view different parts of that scene, and video feeds from the cameras are processed at a computer to generate a photo-realistic synthetic 3D model of the scene. This enables the scene to be viewed from any viewing angle, including angles that the original, real cameras do not occupy—i.e. as though viewed from a 'virtual camera' that can be positioned in any arbitrary position.

2. Description of the Prior Art

Existing 'virtual camera' solutions do not allow setting a virtual viewing angle (i.e. a viewing angle of a scene that does not coincide with the actual shooting angle of a real camera) without noticeable distortion. Nor do earlier systems keep the correct proportions of objects in the frame as the position of the virtual camera alters. Nor do earlier systems enable viewing angle amendments to be made in real time.

Also the existing solutions do not allow obtaining images from an arbitrary number of cameras that might be used in, for instance, an automatic multi-camera computer vision system. Automatic settings of each video camera in a multi-camera system—white balance, precise shutter opening speed synchronization, shutter, aperture and the frame rate—would be very different for all of these cameras, which makes working with and processing a set of images obtained from an array of these cameras very complicated.

Unlike the existing modeling systems (for example, lidar-based ones), the performance of implementations of this invention are based on conventional consumer-grade digital video cameras, which significantly reduces the cost of the solution. These implementations do not cause adverse health effects with emissions and do not interact with other active systems.

US 20140015832 describes a system reconstructing a 3D model from a set of video files obtained from shooting a single scene. The video files are synchronized with a global event (e.g. a flash) then the individual position of each camera is calculated for every frame. Presumably the video cameras are not fixed immovably. Then a 3D model reconstruction is processed, the textures are selected and mapped on the 3D model, and weather conditions are identified and simulated. The system is mostly intended for car tracking. Unlike the system we describe, this system does not rely upon permanently fixed cameras, the reconstruction is undertaken for each frame individually, which makes real-time processing in high-resolution impossible.

U.S. Pat. No. 6,940,538 describes a video synthesis system based on data obtained from a real time video camera and an additional synthetic object. The system contains one fixed video camera providing textures for a pre-defined model. A synthetic object is introduced in the model. The video is synthesized from the position of a real camera and the scope coinciding with the real camera and reflecting the synthetic object as a part of the scene. This solution relies upon one video camera usage, which does not allow shooting a wide scale scene or amending the viewing position from which the video is synthesized.

U.S. Pat. No. 6,674,461 describes a method of shooting a scene with a few video cameras; the footage obtained is mapped on a synthesized virtual scene. The approach described is designed for shooting a sole object, not an entire scene, so its authors do not provide a solution for fixing the lighting difference across the scene. The problem of setting up the cameras for real time shooting is not solved either. Also the system, unlike our one, has a limitation of 3 cameras only.

US 20120314089 is a method of time-based synchronizing a system of cameras. Auto calibration based on analysis of images obtained from the cameras is used here. Unlike our system, this method relies upon time-based synchronizing only; no solution for synchronizing white balance and exposure settings is provided.

EP1352521 describes a system of a few video cameras used for generating an optimal image of an object. Along with the cameras covering partial view only, a wide-angle video camera covering the entire view is used here. Unlike our system, this approach does not provide any solution for synchronizing of settings, and the wide-angle camera's settings are not used for controlling other cameras.

EP2695371 describes a system designed for 3D photo shooting, with light distributed evenly between a couple of cameras using a mirror, which achieves the same level of illumination for both of those cameras. Unlike our system, the method relies upon a mechanical synchronization (a mirror) only, no digital system of setting synchronization of two cameras is described (e.g., one camera's settings are not transferred to another one).

SUMMARY OF THE INVENTION

1. A method of showing a scene viewed by multiple digital cameras, comprising the steps of:
(a) some of the cameras viewing different parts of that scene;
(b) one or more video feeds from some or all of the cameras being processed at a computer to generate a photo-realistic 3D model of the scene, that photo-realistic model being viewable on one or more displays; and in which the computer is programmed such that
(c) the 3D model combines both static elements that do not alter in real-time, and also dynamic elements that do alter in real-time or near real-time.

Optional features include any one or more of the following:
  the computer can selectively turn-on dynamic modeling of specific portions of the scene.
  a motion detection algorithm can determine if a specific portion of the scene is changing and hence requires dynamic modeling.
  the computer controls the parameters or settings on multiple cameras, such as white balance, shutter speed, aperture settings, frame rate, so that the 3D model can seamlessly present the view from those multiple cameras.

the parameters or settings are synchronized or made equal at levels that the computer determines is optimal.

the parameters or settings are varied to levels that the computer determines is optimal to ensure that no areas are under or over-exposed.

the system also includes one or more cameras whose parameters are independent and hence not are synchronized or made equal with any other cameras.

the cameras include a master camera whose view overlaps the view from several of the other cameras.

the feed from the master camera determines white balance and/or exposure for some of the other cameras.

the feed from the master camera is not used to generate the photo-realistic 3D model of the scene.

the image feed from several cameras is processed to generate a texture for a specific surface or object in the scene.

effects associated with real-time weather conditions are added to the 3D model.

Another aspect is an elevator including a display showing images generated by a method as described above.

A third aspect are landing doors including a display showing images generated by a method as described above.

DETAILED DESCRIPTION

Figure 1:
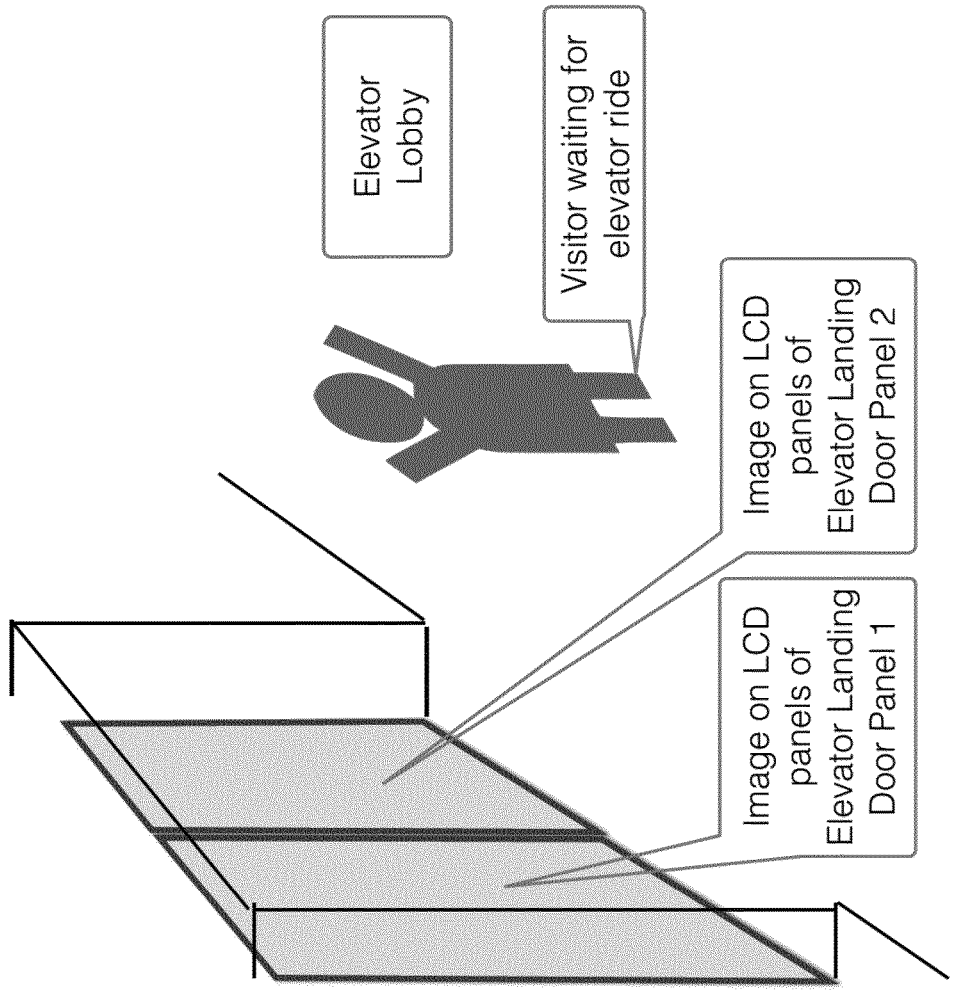
FIGS. 1-6 are schematic illustrations of an implementation of the invention used in an elevator.

An implementation of the invention is a hardware-software system that displays realistic three-dimensional scenes based on 3D-models and video streams. It also allows displaying the scene from different angles, i.e. as a virtual camera system.

The video stream is taken from an array of video cameras, shooting the desired scene. This array of video cameras has a number of settings that are controlled in a real-time mode.

The system controls white balance, camera shutter opening times, shutter speed, aperture and the camera frame rate automatically, analyzing the images obtained from each camera individually. Settings can be applied to a specific camcorder and transmitted in parametric form to each camera; each setting is transmitted as a function of or depending on the particular camera's position. An automatic tuning system of the cameras allows displaying correctly the area of the scene shot simultaneously by multiple cameras, even if the shooting conditions prevent the use of automatic settings.

The obtained video stream is processed and used for scene modeling. The solution proposed combines static modeling of 3D scenes and dynamic simulation of individual parts of the scene. When using only dynamic simulation, significant computing power is required, the precision of the model is sufficiently low, the dependence on weather conditions is considerably high, and the recognition applies on for example Lambertian surfaces only (which excludes glares, water surface, etc.).

When using static modeling only, the presence of moving objects or new objects in the scene causes significant model distortion.

Using both static and dynamic modeling allows avoiding most of the drawbacks of these approaches. It significantly reduces the computational load required for the model creation, a considerable number of non-Lambertian surfaces can be treated statically, static objects can be modeled with a maximum possible accuracy (up to 1 pixel of the input image from a camera), motion of objects in the scene (e.g., trees) are processed in a dynamic manner (e.g. in real time), new objects in the scene are detected and modeled dynamically as well. In diverse weather conditions, when the usage of algorithms for dynamic modeling is unfeasible, the system goes on operating based on static modeling.

In addition, for the parts of the scene with no moving objects, only static simulation might be used, which brings the consumption of computing resources to a minimum.

The implementation allows switching on dynamic modeling for any zone of the scene with flexibility, which is essential for quick modification of the model in case the scene is changing. The system uses a set of algorithms for modeling and working with images:

mapping frames obtained from different cameras to get the full texture of an object (for example, if there is an object in the scene partially overlapping another object, multiple cameras are used for obtaining the full texture of the second object)

combining object textures obtained from multiple cameras into a single texture to design the best view of the object (for example, in the case of insufficiency of the camera matrix, or dynamic range, then multiple cameras with different exposure settings would be used to generate the texture)

joining images obtained from multiple cameras to get a panoramic view or for modeling an image that cannot be shot with one camera separation of objects from their background based on the information about the colors and brightness of the objects or the background for scene modeling on different levels (for example, making a tree popping up on the foreground)

separation of objects from their background using the effect of optical focus on the object and the camcorder segmentation algorithms (e.g., highlighting a tree or a banner on the front or middle ground)

selection of objects using data obtained from multiple cameras with stereovision algorithms getting the depth map of a whole scene or its part using stereovision algorithms highlighting background and moving objects on the images obtained from the cameras using motion detection algorithms tracking images of moving objects using tracking algorithm depth map generation at the stage of statistical modeling to be used in dynamic simulation algorithms Also the method provides the following options:

Adding extra artificial elements to the generated scene model or editing existing elements of the scene (for example, adding information banners, displaying static or moving objects, hiding unwanted elements of the scene, etc.)

Recording and playing back 3D scenes at any instance of the system (for example, a football game recorded can be played back on home TV with the option of changing the rendering angle at any time)

Depending on the type of scene, different sets of algorithms can be used. The choice of set can be made manually or automatically basing on the attributes of the scene model. For example, if freestanding poles or trees are presented in the scene, an algorithm of separation from the background based on the color or brightness characteristics of the background should be used. If moving objects are pictured in the scene, such as vehicles, people, etc., then an allocation algorithm and a tracking moving objects and background extraction algorithm should be used. Flags on the stage can be defined either by stereovision algorithms or by separating them from the background based on the color or brightness characteristics of the flags or of the background.

The resulting image sent to the displaying device is obtained from the render of the current 3D model angle with mapped textures, from the point of the virtual camera's current location. The angle can be set and modified manually by the user at runtime to obtain the desired look. Also the angle can be set automatically based on data obtained from external sensors. For example, when designing a virtual window in a lift, the angle is determined by the height sensor reading the lift position. Or, for example, to display a panorama, the data for figuring out the required angle can be obtained from the virtual binoculars direction sensor. The system supports rendering a scene from various angles simultaneously.

Weather conditions can be recognized and reconstructed in a scene model. Also, while rendering, a virtual glass effect relevant to the weather conditions can be added. For example, water drops on the glass may be added.

Processing algorithms can be performed either on a PC, or on dedicated computers, such as:
  GPU as parts of PC
  dedicated evaluation boards, including DSP or FPGA
  computing servers, e.g. based on GPU, DSP, FPGA
  remote computing cluster The system allows distributing the load between the calculators to ensure optimal system performance in real-time mode and to minimize its cost.

Thus, only the final result of the processing is transmitted to the subsystem for displaying on screens. The processing subsystem of the computing cluster executes capture from cameras and all the necessary treatment.

Core features of an implementation are a software-hardware system including a set of cameras, a set of PC computing modules, a description of the static and dynamic elements for the 3D model scene, a description of camcorders' configurations, a description of rendered scene output configurations, a description of the computing modules configuration. The number of cameras, PCs, computing modules, configurations and descriptions may vary depending on the particular scene the system is used for.

The system has the following features:
  possibility of static and dynamic modeling based on data obtained from cameras located at predetermined fixed positions or computed positions
  possibility to use only dynamic or only static scene modeling
  support of retrieving static model developed in another application designed for 3D modeling (e.g., Adobe 3D Studio Max)
  support of the static model generating by dynamic algorithms of the system support of statically or dynamically configurable set of scene modeling algorithms:
    separation of objects from their background based on the data of colors and brightness of objects or background for modeling different levels of the scene
    highlighting objects using data obtained from multiple cameras using stereovision algorithms
    obtaining the depth map of the entire scene or its part using stereovision algorithms
    highlighting background and moving objects on the images obtained from the cameras using motion detection algorithms
    tracking images of moving objects using tracking algorithms
    generating a depth map at the stage of statistical modeling for usage in dynamic simulation algorithms
  Support for statically or dynamically configurable sets of algorithms for textures:
    joining the fragments of texture obtained from multiple cameras to get the solid object texture
    mapping the textures of one object obtained from multiple cameras into a joint texture to provide the best quality image of the object
    docking or merging images obtained from multiple cameras to get a panoramic view, or for creating an image that can not be obtained from one camera
  support for connectivity with additional scene modeling or texture processing algorithms
  support for real-time modeling and rendering
  support for manual and automatic angle selection for rendering:
    in the manual mode, the user can change the angle while the system is configurable within the constraints of the model
    in the automatic mode, the angle can be set up based on the data obtained from external sensors
  support for simultaneous rendering from multiple angles
  support for various types of calculators with option of distributing the load between them:
    PC
    GPU as a part of these PCs
    specialized evaluation boards, including DSP or FPGA
    computing servers, including GPU, DSP, FPGA based
    remote computing cluster
  ability to bring the reconstructed scene to any number of screens
  adding an additional artificial element to the generated scene model, or editing the existing elements of the scene
  possibility of recording and playing 3D scenes on any instance of the system
  support for recognition and modeling of weather conditions
  the mutual positions of the camcorders and their shooting direction is known at any time
  camera shooting direction is chosen based on the need to cover a certain scene containing both still and moving objects. Coverage is determined by the multi-angle scene display.

The camcorders sets with special controlling cameras may be selected in the system. The view of the controlling camcorder is partly overlapping the view of each camera in the set. Such sets of cameras and camcorders are allocated and installed to synchronize the parameters of the cameras in the group while shooting certain areas. In some particular cases these sets of cameras may consist of 2 cameras with partially overlapping views and with shooting options synchronized The set is synchronized by exposure, white balance and frame per second rate.

The cameras are integrated into the network so that the entire scene image can be obtained at any time The cameras can capture images sequentially with different settings (for example, to combine multiple images into a single high dynamic range they may use HDR image)

Usage of different video cameras and lens parameters (focal length, diaphragm) is enabled Simultaneous usage of multiple video cameras with various resolutions and different frame rates is enabled System Structure The system contains the following components:

C-1, . . . , C-P—individual cameras for obtaining a scene with independent shooting parameters. There might be a few cameras of this type, or there might be none of them. The system also may contain this type of camera only.

G-1, . . . , G-K—groups of cameras synchronized based on the shooting parameters. The groups might be missing, or there might be few of them, depending on the number of objects that can't be covered by only one camera.

G-R-C-1, . . . , G-R-C-N—group G-R cameras synchronized basing on the shooting parameters with the master G-R-M camera (R takes values from 1 to K).

G-R-M—master G-R-M camera of the group (R takes values from 1 to K). This type of camera might be also used for obtaining a scene image if the group consists of 2 cameras only.

CC—processing and controlling computer. It is recording video data from all cameras, performing processing algorithms, managing video cameras. There might be one or a few of those to distribute the load. They can be placed remotely.

LAN—local computer network for transmitting data from cameras to the processing and controlling computer MON-1, . . . , MON-Q—displays for monitoring the image results System Installation From the installation point of view the system has some specific features, such as:

Pre-determined mutual positioning and shooting directions for all the cameras

The entire scene is covered

The shooting areas of different cameras may partly overlap each other

For the groups of cameras that require synchronization of shooting parameters an additional master camera shooting the same area (wholly or partly) might be installed.

There is an option of installing a few video cameras for shooting a certain part of the scene to extend the dynamic range of shooting.

Regarding the installation of computers for processing and controlling, they might be located inside the same building, as in a remote data center, if the existing bandwidth is high enough. There might be from 1 to an entire array of computers, depending on the number of cameras used and on the complexity of the scene processed.

The display device comprises an array of monitors, from 1 to many. The monitors might be arranged inside the same building or in remote buildings.

System Functions

From the point of view of processing the images obtained from cameras and generating previews, the system performs the following cycle:

obtaining image from video cameras reconstructing 3D model's dynamic elements obtaining texture of the objects mapping the texture onto a 3D model exposing the model display angle in accordance with user requirements or indication of external sensors rendering model in accordance with the configuration of displaying devices outputting rendered image on displaying device From the point of view of controlling the cameras, the system performs the following cycle:

obtaining the shooting settings: the camcorder interface for obtaining automatically calculated shooting settings parameters calculation: collecting scene data and establishing the optimal parameters for tuning cameras in the group together with the master camcorders computing the unified optimal shooting settings for cameras in the group calculating shooting settings to provide the wide dynamic range of shooting the particular part of the scene applying the parameters for all the cameras in the group Structure of the System The system consists of:

C1—a camera with individual shooting settings, shoots the sky with a fast shutter speed G1—a group containing video cameras C2, C3, C4 with synchronized shooting settings and a master camcorder M1, shoot Building A M1—a master camcorder computing white balance and exposure for G1 group of cameras C5—a camera with individual shooting settings, shoots the foreground with long exposure LAN—a local computer network for transmitting video data from cameras to a host computer and transferring control commands from the control computer to the camcorders PC—a computer for processing and operating the system, it's recording video data obtained from all cameras, setting up the shooting time parameters, operating the processing algorithms, controlling the shooting settings for the groups of cameras. There might be one or few of those to distribute the load. They can be placed remotely.

MON—displays for monitoring the image results

Building A—a high-rise building sitting on the stage

Building B—a high-rise building with the cameras, LAN and PC are installed on stationary Camcorders C1-C5 are used to capture the scene. Each camera or group of cameras takes a specific part of the scene. Scopes of the cameras are partly overlapping each other.

M1 camcorder is shooting the same part of the scene as the G1 group of cameras is (cameras C2-C4 in total). M1 camera settings are transferred to PC via LA. MC computer is establishing shooting settings for G1 group of cameras basing on the settings transferred from M1.

C1-C5 cameras are calculating individual shooting settings automatically basing on frames regions in use.

Only images obtained from C1-C5 cameras are used for displaying the scene.

Advantages of the System

The advantages are as follows:

obtaining the scene image of any scale in real time possibility of moving the display angle or virtual viewing position around the stage or scene possibility of balance loading by scaling system components possibility of processing static views and the views containing dynamic objects high quality images use of standard camcorders that are easy to install and maintain the system does not interfere with other devices and doesn't cause any harm to people, as the system is passive quality of footage for the entire scene or its parts may be improved by extending the shooting dynamic range resolution of the object displayed can be increased by shooting its parts with different cameras sharing synchronized settings one or more angles of a scene can be changed at any time, as the scene is covered completely by all cameras with synchronized settings The system allows solving the following scene shooting problems:

presence of dynamic objects—due to the dynamic modeling, the objects are displayed on the stage/scene correctly texture distortion with angle changing—due to the texture mapping on a 3D model, as well as due to the possibility of combining textures obtained from different cameras, a high quality image taken from any arbitrary angle is available significant scatter of light levels at different parts of the scene—in such cases a dynamic range of one camera matrix is not sufficient to shoot the entire scene. The system allows configuring the scene shooting using multiple cameras with different exposure settings automatically, so that the scene is without underexposed or overexposed areas at any time diverse white balances and illumination levels across the scene—as a result of differences between illumination levels and the types of lighting sources in the particular parts of the scene where white balance and exposure are measured. It is particularly complicated if the junctions of the areas are filmed with different cameras and the joints between them don't fit the real joints between the objects in the scene. For example, if the lower part of the building is filmed with one camcorder in artificial light and the upper part of it is filmed with another camcorder in much more natural bright light, it's essential that there's no a sharp transition between the parts of the building when displaying the entire image. The system allows synchronizing white balance for the cameras shooting these parts of scene that need to have the same white balance and illumination level time varying illumination of different parts of a scene—areas of a scene can be illuminated diversely at different times of day, so static camera tune-up becomes impossible. For example, in afternoon the entire scene can be evenly brightly lit, but at sunset only the top parts of the scene will be lit brightly enough, and the bottom parts will be in shade. The system can automatically adjust for light amendments using master cameras Areas of Application This solution might be used whenever 2D or 3D real-time reconstruction of complex and extended in space scenes is required.

Thus, implementation of the following systems becomes feasible:

real-time city panorama displaying and synthesis of its view from any point placed within the area covered by the cameras If the cameras are positioned vertically, a synthesis of views from any point on the vertical line between the lowest and the uppermost cameras becomes available. Movement of an elevator might be synthesized If the cameras are positioned horizontally, a synthesis of horizontal view is available. A cyclorama might be synthesized Matrix camera positioning allows moving the point of synthetic scene view in two dimensions within the coverage of the cameras system. A cycloramic elevator's motion view might be synthesized 3D reconstruction of moving objects (e.g. people, cars) by pre-constructing a stationary objects' model and predicting the moving objects' motion Identification and selection of objects in the scene by installing cameras with overlapping views in the areas where the recognition is required Adding artificial objects to the scene. City panorama with markers of attractions, information boards, etc. might be synthesized Creation of "virtual" windows in buildings with option of moving the angle automatically (for example, if the virtual window is placed in a moving elevator)

Systems of assistance for drivers and crews:

360 degrees view systems providing a panoramic view outside the vehicle top view systems, providing a virtual view from the top Shooting and 3D reconstruction of events. The system allows moving the virtual camera and seeing the event from the most advantageous angles, in real time or as a playback.

Virtual guiding. The system allows to track a person, to comment on what he can see or guide him along the route Obtaining a nonstop image of a production line Obtaining a nonstop image of trains High effective resolution shooting by multiple cameras with narrower angle lens Flowchart Blocks Description The system contains the following blocks:

C-1, . . . , C-P—single video cameras for obtaining the scene view with independent shooting settings G-1, . . . , G-K—groups of cameras synchronized by shooting settings. The groups might be missing, or there might be few of them, depending on the number of objects that can't be covered by one video camera.

G-R-C-1, . . . , G-R-C-N—video cameras of G-R group synchronized by shooting settings with G-R-M master camcorder (R takes values from 1 to K).

G-R-M—master-camcorder of G-R group (R takes values from 1 to K). This camera might be also used for obtaining scene image if the group consists of 2 cameras only.

CC—a computer for processing and operating the system. There might be one or a few of those to distribute the load.

LAN—local computer network for transmitting data from cameras to the processing and controlling computer MON-1, . . . , MON-Q—displays for monitoring the image results Blocks Interfaces Camcorders C-1, . . . , C-P, G-R-C-1, . . . , G-R-C-N, G-R-M transfer the video stream to CC computer Camcorders G-R-C-1, . . . , G-R-C-N support software interface of the system, real-time shooting settings white balance, exposure CC computer interacts with camcorders G-R-C-1, . . . , G-R-C-N, G-R-M for calculating and making up the shooting settings for the groups of cameras CC computer is interacting with MON-1, . . . , MON-Q displays providing the output image All the cameras, operating computers and displays are interacting through LAN local computer network Sensors of angle automatic settings for image are connected to a display subsystem Figures The displays can be integrated with the elevator or landing doors, as shown in FIGS. 1-6.

FIG. 1 shows the system with large LCD displays integrated into the elevator landing doors (i.e. the doors in each floor of the building).

Figure 2:
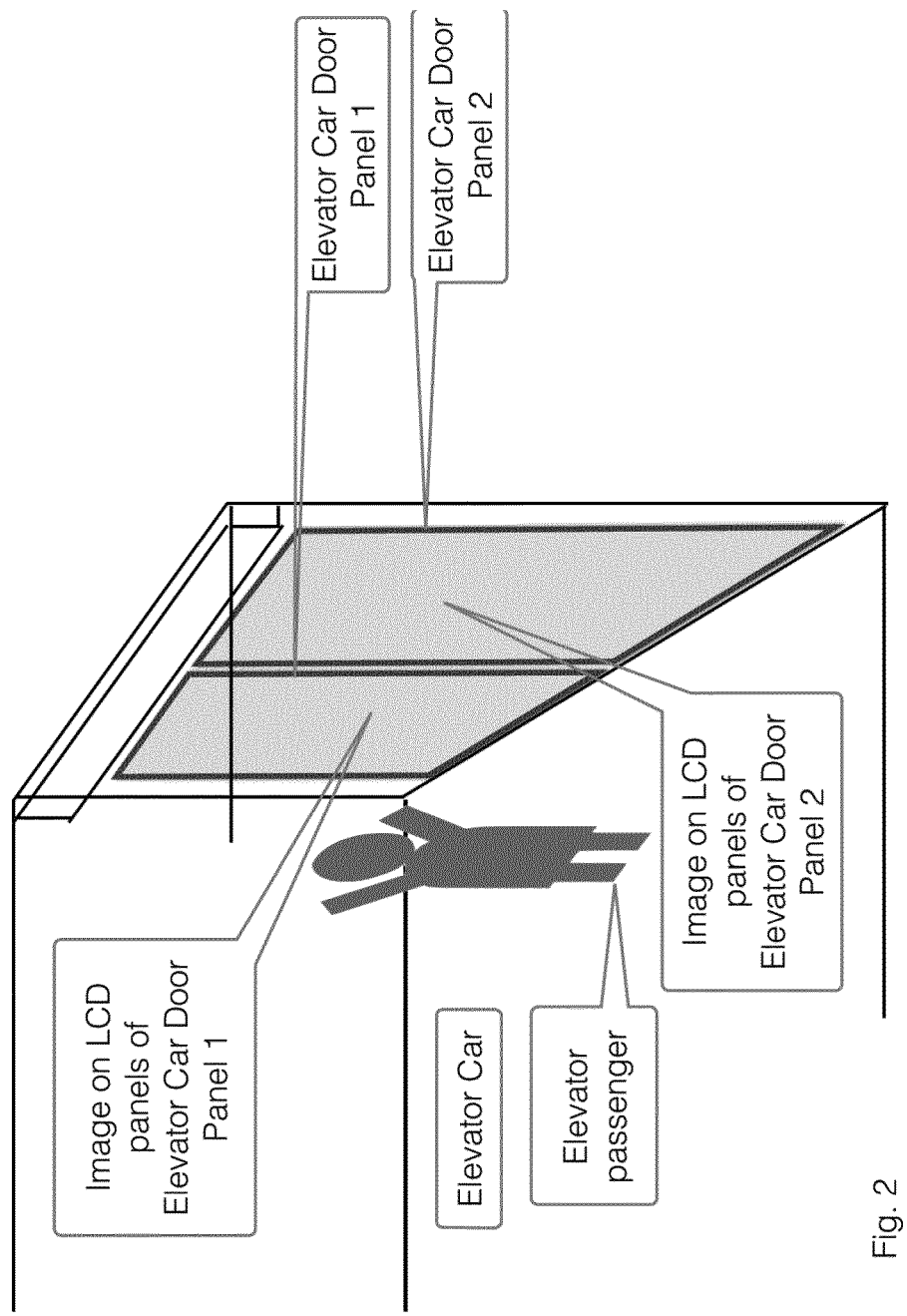

FIG. 2 shows the system with large LCD displays integrated into the elevator car doors (i.e. the doors in the elevator car). The LCD displays can be positioned anywhere in the elevator car, and can cover (all of some of) one, two or more walls (and also the roof and floor).

Figure 3:
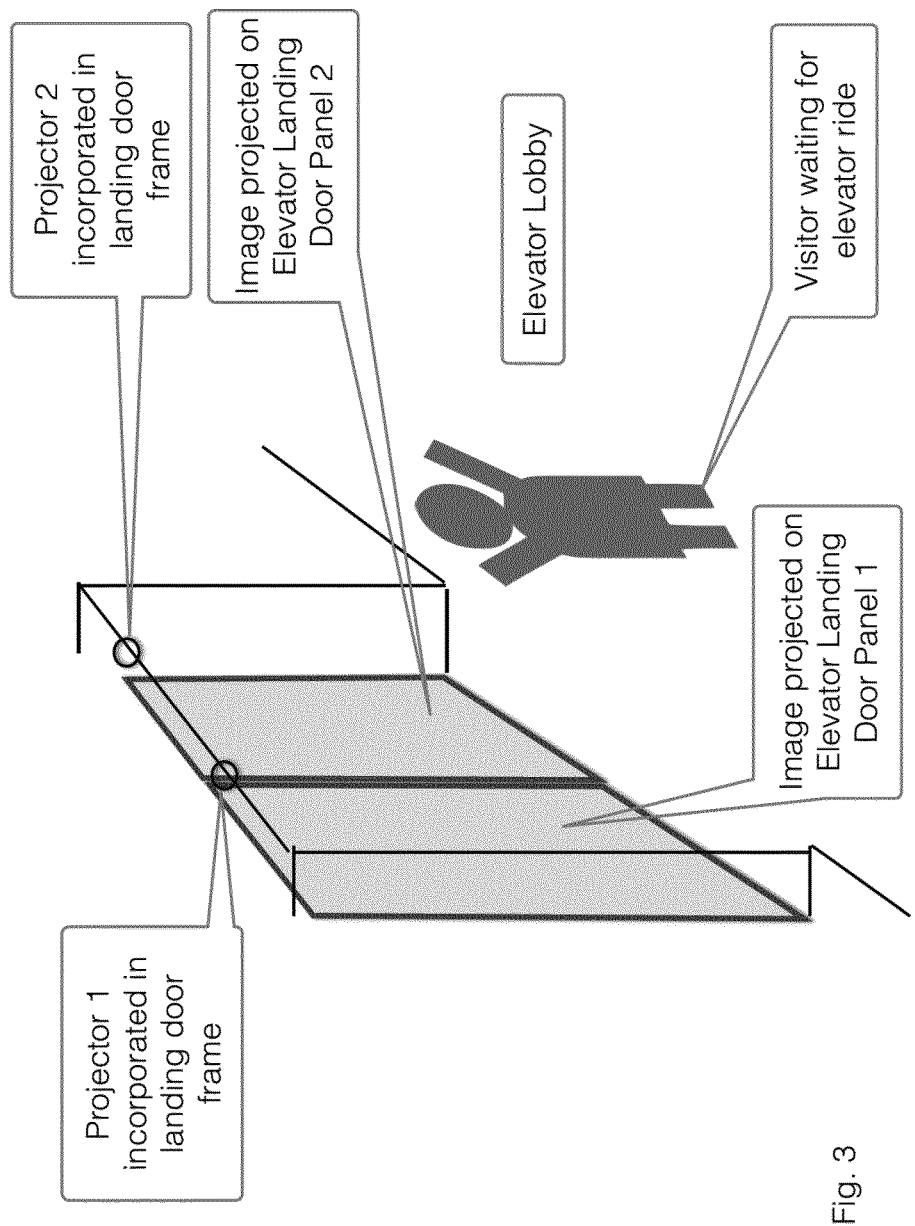

FIG. 3 shows the system with the displays integrated into the elevator landing doors (i.e. the doors in each floor of the building); in this case projectors mounted over the doors and in the landing door frame project the image onto the displays (which can be a conventional projector screens).

Figure 4:
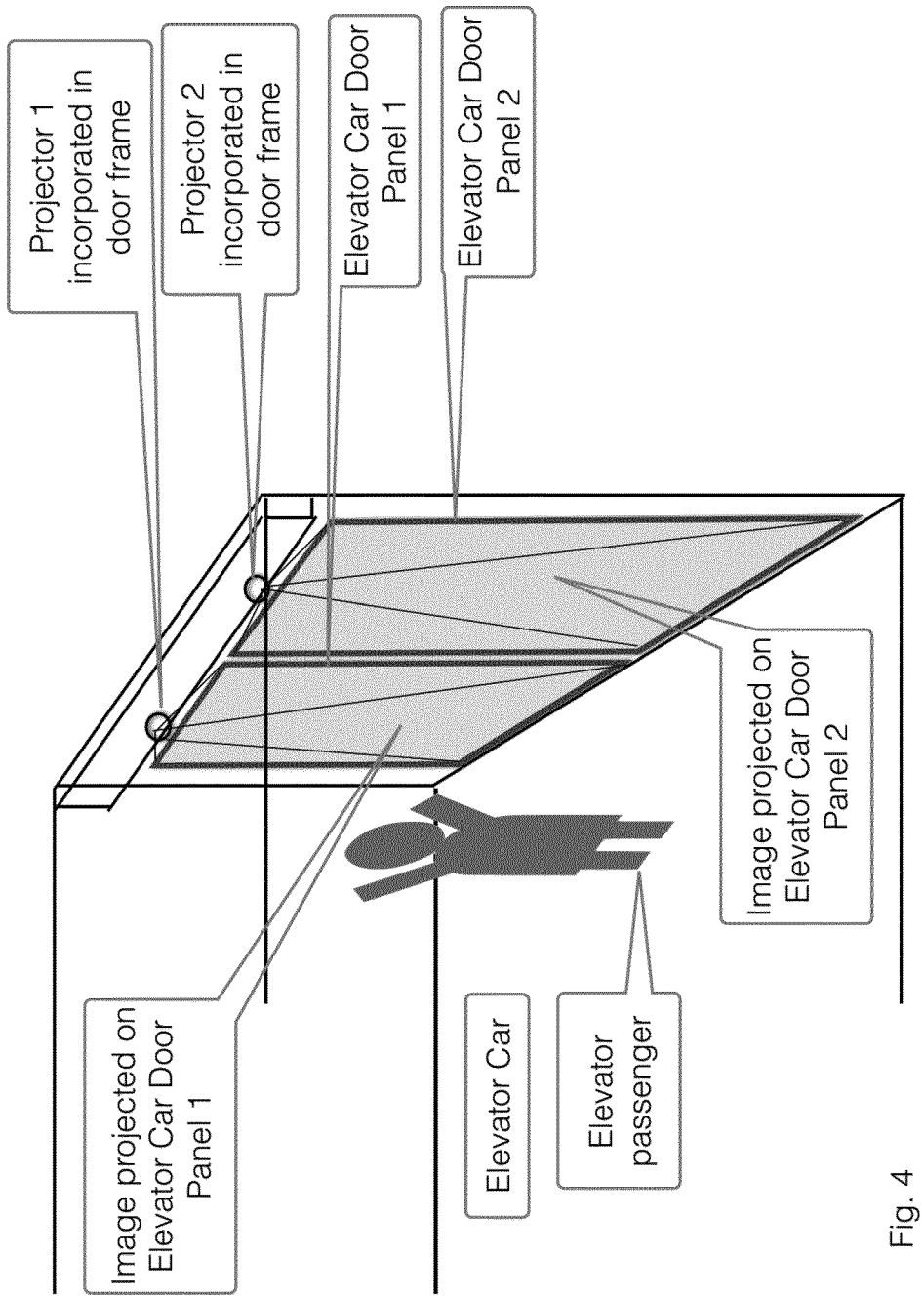

FIG. 4 shows the system with large projection displays integrated into the elevator car doors (i.e. the doors in the elevator car). The displays can be positioned anywhere in the elevator car, and can cover (all of some of) one, two or more walls (and also the roof and floor). Projectors are integrated into the elevator car in the door frame.

Figure 5:
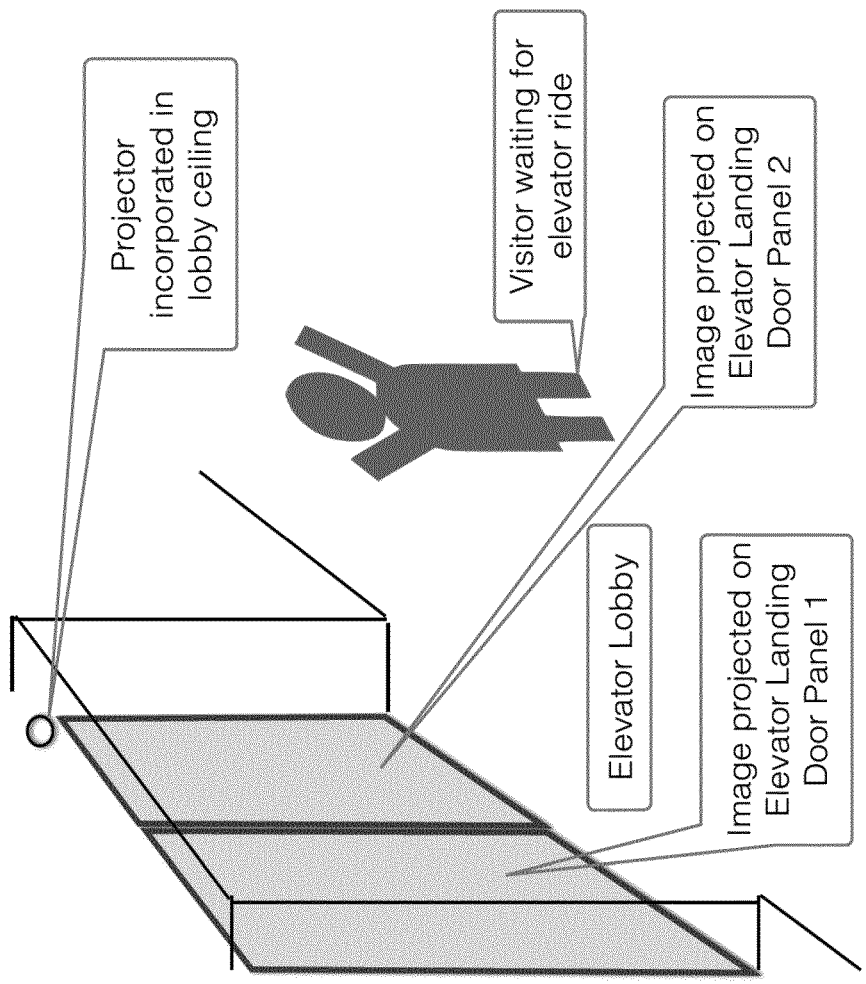

FIG. 5 shows the system with the displays integrated into the elevator landing doors (i.e. the doors in each floor of the building); in this case projectors mounted over the doors and in the ceiling project the image onto the displays (which can be a conventional projector screens).

Figure 6:
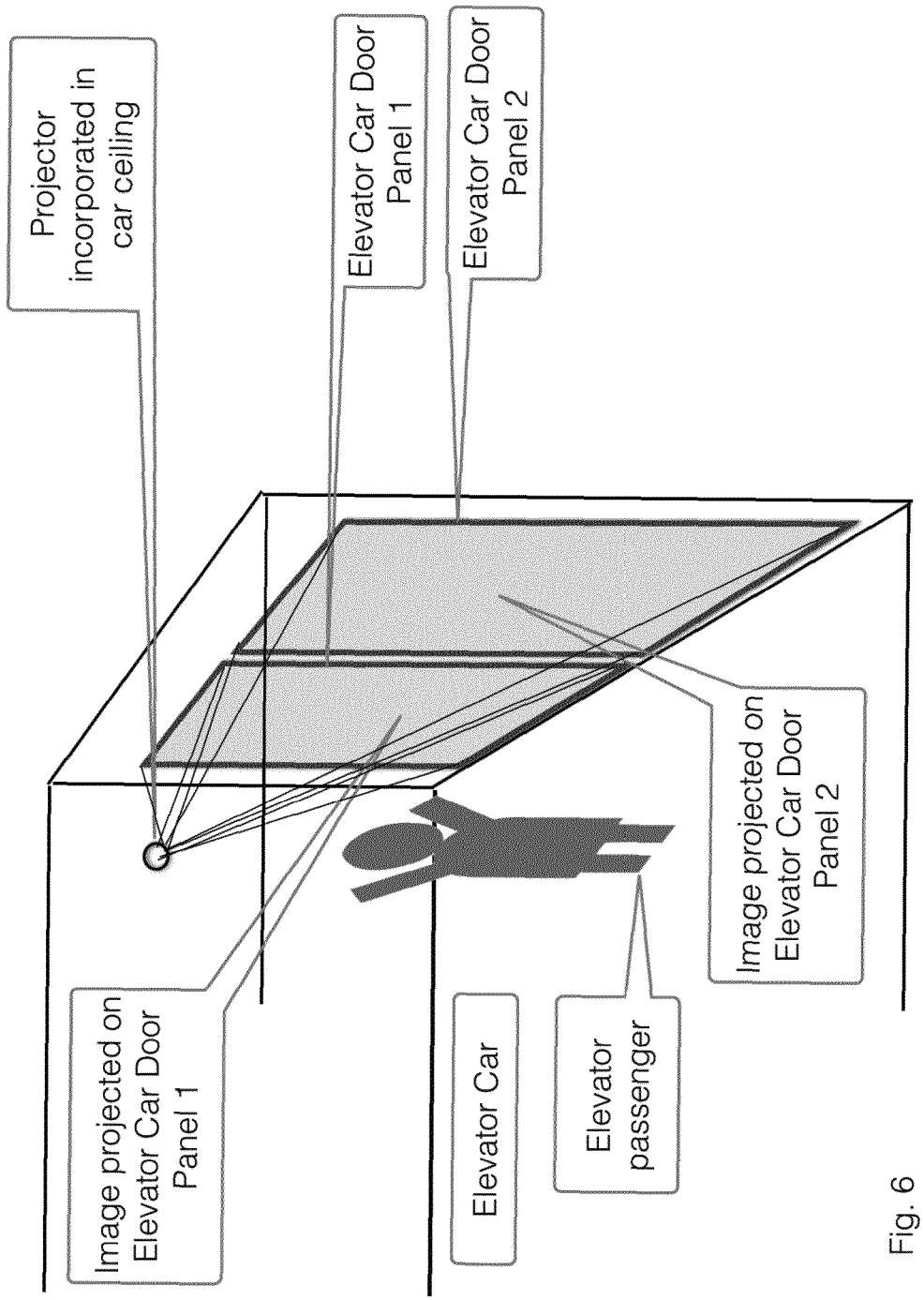

FIG. 6 shows the system with large projection displays integrated into the elevator car doors (i.e. the doors in the elevator car). The displays can be positioned anywhere in the elevator car, and can cover (all of some of) one, two or more walls (and also the roof and floor). Projectors are integrated into the elevator car ceiling.

Figure 7:
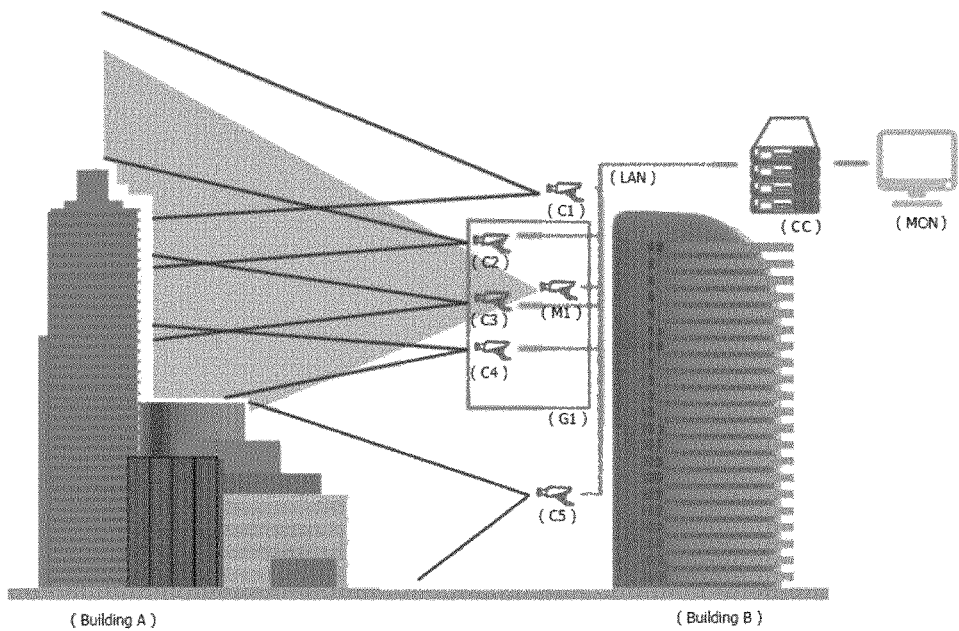
FIG. 7 is a schematic illustration of an implementation of the invention showing cameras mounted on a building and looking out over a city scene.

FIG. 7 shows the above system shooting a scene for modulating a virtual window in an elevator in Building B; there is a display in one or more elevators in Building B and the display shows the view of the city scene outside of Building B, including the Building A grouping, as though the elevator were a glass elevator—i.e. the small number of cameras fixed to the outside of Building A enable the system to generate a virtual camera positioned at any height on the Building B and so the display shows a smoothly changing scene that accurately corresponds to what would be seen from the height the elevator has reached. Permanent objects in the scene, such as roads, buildings, trees, are statically processed and a photo-realistic, fully textured computer generated 3D model of these objects is created which can be viewed from any angle. Moving objects, such as cars, trains, people, are dynamically captured in real time and modeled. The display in the elevator can hence show a combination of highly detailed permanent objects, plus real-time, dynamically generated CGI of moving objects.

Figure 8:
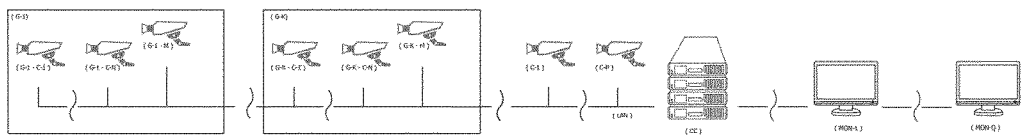
FIG. 8 shows the hardware used in the system.

FIG. 8 shows the general scheme of camcorders connections in the system

Figure 9:
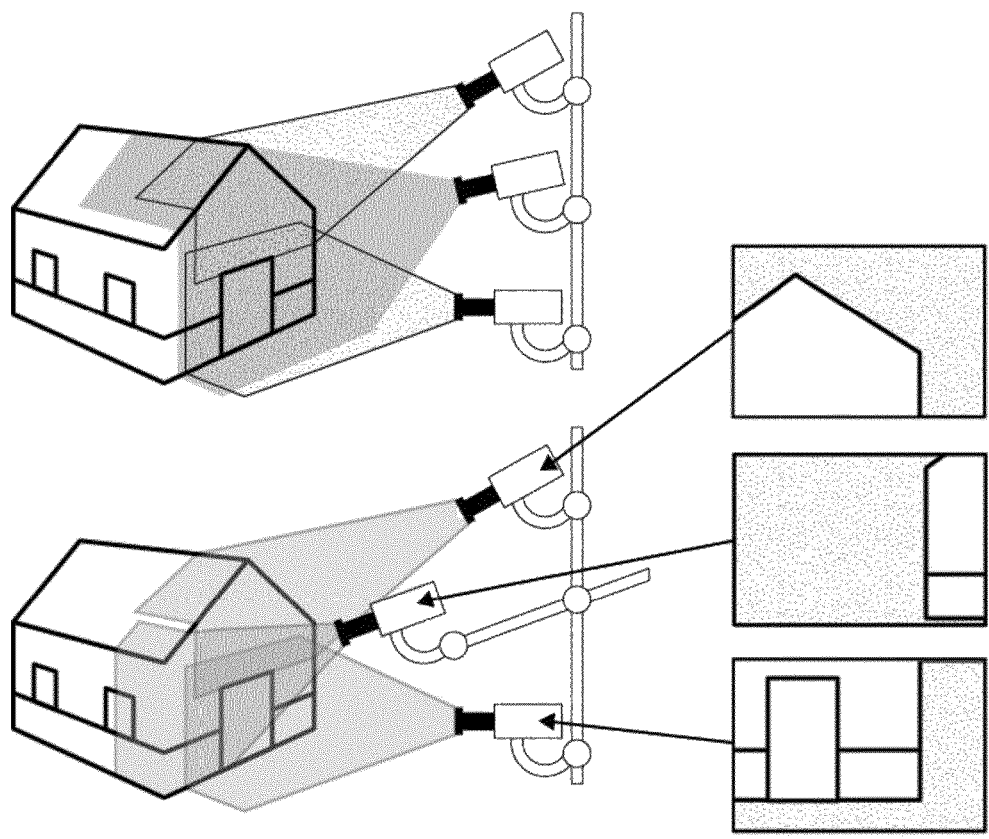
FIG. 9 is a schematic illustration of an implementation of the invention showing cameras, including a master camera, viewing a building

FIG. 9 shows shooting a building using several cameras including the master camcorder, and shows the different parts of the scene that are captured and that are synthesized into the accurate 3D model.

Features

1. Cameras—analog and digital ones, able to obtain video stream in real time mode
2. Cameras network—any, allowing the connection and video stream transmission to network, directly or via devices (e.g., Ethernet, Fiber, USB)
3. Camera models—arbitrary, if shooting synchronization (white balance, exposure and ideally the shutter opening as well) is not required. Although if synchronization is essential, only cameras with this option available might be used (e.g., Beward BD3570 (in some cases), IDS 5481VSE-C)
4. Camera lenses—any, fitting the interface of the camera in use. It's advisable to use the lenses with minimal distortion. The lenses with a fixed focal length with distortion less than 1% and a resolution of 3 megapixels or more would suit perfectly (e.g. Kowa LM5JC10M, Kowa LM3NCM)
5. Camera parameters required—any cameras obtaining digital video stream in real time mode are suitable. If shooting synchronization (white balance, exposure and ideally the shutter opening as well) is required, only cameras with this option available might be used (e.g., Beward BD3570 (in some cases), IDS 5481VSE-C).

Key Concepts

Each of the following concepts A-G can be combined with any other concept A-G; all optional features can be combined with any other optional feature.

A. A method of showing a scene viewed by multiple digital cameras, comprising the steps of:

(a) some of the cameras viewing different parts of that scene;

(b) one or more video feeds from some or all of the cameras being processed at a computer to generate a photo-realistic 3D model of the scene, that photo-realistic model being viewable on one or more displays; and in which the computer is programmed such that (c) the 3D model combines both static elements that do not alter in real-time, and also dynamic elements that do alter in real-time or near real-time.

A system comprising multiple digital cameras viewing a large scene, such as a part of a city, some of the cameras viewing different parts of that scene, and one or more video feeds from some or all of the cameras being processed at a computer to generate a photo-realistic 3D model of the scene, that photo-realistic model being viewable on one or more displays; and in which:

the 3D model combines both static elements that do not alter in real-time, and also dynamic elements that do alter in real-time or near real-time.

Note that the term 'computer' is not limited to a single computer, but can be any number of computers, for example operating in a distributed manner, with some computing elements optimized for off-line processing and some for real-time processing.

Other Optional Features:

System can selectively turn-on dynamic modeling of specific portions of the scene.

Motion detection algorithm can determine if a specific portion of the scene is changing and hence requires dynamic modeling Static elements are processed off-line whereas the dynamic elements are processed in real-time B. A method of showing a scene viewed by multiple digital cameras, comprising the steps of:
(a) some of the cameras viewing different parts of that scene;
(b) one or more video feeds from some or all of the cameras being processed at a computer to generate a photo-realistic 3D model of the scene, that photo-realistic model being viewable on one or more displays; and in which the computer controls the parameters or settings on multiple cameras, such as white balance, shutter speed, aperture settings, frame rate, so that the 3D model can seamlessly present the view from those multiple cameras.

A system comprising multiple digital cameras viewing a large scene, such as a part of a city, some of the cameras viewing different parts of that scene, and one or more video feeds from some or all of the cameras being processed at a computer to generate a photo-realistic 3D model of the scene, that photo-realistic model being viewable on one or more displays; and in which:

the computer controls the parameters or settings on multiple cameras, such as white balance, shutter speed, aperture settings, frame rate, so that the 3D model can seamlessly present the view from those multiple cameras.

Other Optional Features:
The parameters or settings are synchronized or made equal at levels that the computer determines is optimal.
The parameters or settings are varied to levels that the computer determines is optimal to ensure that no areas are under or over-exposed
System also includes one or more cameras whose parameters are independent and hence not are synchronized or made equal with any other cameras C. A method of showing a scene viewed by multiple digital cameras, comprising the steps of:
(a) some of the cameras viewing different parts of that scene;
(b) one or more video feeds from some or all of the cameras being processed at a computer to generate a photo-realistic 3D model of the scene, that photo-realistic model being viewable on one or more displays; and in which the cameras include a master camera whose view overlaps the view from several of the other cameras.

A system comprising multiple digital cameras viewing a large scene, such as a part of a city, some of the cameras viewing different parts of that scene, and one or more video feeds from some or all of the cameras being processed at a computer to generate a photo-realistic 3D model of the scene, that photo-realistic model being viewable on one or more displays; and in which:

the cameras include a master camera whose view overlaps the view from several of the other cameras.

Other Optional Features:
feed from the Master camera determines white balance and/or exposure for some of the other cameras
feed from the master camera is not used to generate the photo-realistic 3D model of the scene D. A method of showing a scene viewed by multiple digital cameras, comprising the steps of:
(a) some of the cameras viewing different parts of that scene;
(b) one or more video feeds from some or all of the cameras being processed at a computer to generate a photo-realistic 3D model of the scene, that photo-realistic model being viewable on one or more displays; and in which the image feed from several cameras is processed to generate a texture for a specific surface or object in the scene.

A system comprising multiple digital cameras viewing a large scene, such as a part of a city, some of the cameras viewing different parts of that scene, and one or more video feeds from some or all of the cameras being processed at a computer to generate a photo-realistic 3D model of the scene, that photo-realistic model being viewable on one or more displays; and in which:

the image feed from several cameras is processed to generate a texture for a specific surface or object in the scene.

E. A method of showing a scene viewed by multiple digital cameras, comprising the steps of:
(a) some of the cameras viewing different parts of that scene;
(b) one or more video feeds from some or all of the cameras being processed at a computer to generate a photo-realistic 3D model of the scene, that photo-realistic model being viewable on one or more displays; and in which effects associated with real-time weather conditions are added to the 3D model.

A system comprising multiple digital cameras viewing a large scene, such as a part of a city, some of the cameras viewing different parts of that scene, and one or more video feeds from some or all of the cameras being processed at a computer to generate a photo-realistic 3D model of the scene, that photo-realistic model being viewable on one or more displays; and in which:

effects associated with real-time weather conditions are added to the 3D model.

F. A method of showing a scene viewed by multiple digital cameras, comprising the steps of:
(a) some of the cameras viewing different parts of that scene;
(b) one or more video feeds from some or all of the cameras being processed at a computer to generate a photo-realistic 3D model of the scene, that photo-realistic model being viewable on one or more displays; and in which the 3D model shows part of the scene in real-time, and other parts are computer-generated images from an imagined historical view, such as tens, hundreds or thousands of years ago.

A system comprising multiple digital cameras viewing a large scene, such as a part of a city, some of the cameras viewing different parts of that scene, and one or more video feeds from some or all of the cameras being processed at a computer to generate a photo-realistic 3D model of the scene, that photo-realistic model being viewable on one or more displays; and in which:

the 3D model shows part of the scene in real-time, and other parts are computer-generated images from an imagined historical view, such as tens, hundreds or thousands of years ago.

Other Optional Features:
the imagined historical view alters as the location of the display alters
the display is in a lift and as the lift moves, then the view moves forward in time, for example starting at the distant past at the ground floor and moving forward in time as the lift ascends or descends
the view at the top of the lift's position corresponds to the contemporary real-time view
the view at the top of the lift's position corresponds not to the contemporary real-time view, but a view from a number of years previously, to give an element of surprise when a person sees the actual view.

G. A method of showing a scene viewed by multiple digital cameras, comprising the steps of:
(a) some of the cameras viewing different parts of that scene;
(b) one or more video feeds from some or all of the cameras being processed at a computer to generate a photo-realistic 3D model of the scene, that photo-realistic model being viewable on one or more displays; and in which the elevator includes one or more of the displays showing the photo-realistic model.

A system comprising multiple digital cameras viewing a large scene, such as a part of a city, some of the cameras viewing different parts of that scene, and one or more video feeds from some or all of the cameras being processed at a computer to generate a photo-realistic 3D model of the scene, that photo-realistic model being viewable on one or more displays; and in which: the elevator includes one or more of the displays showing the photo-realistic model.

Other Optional Features:
- the display is formed as part of the elevator car door(s), viewable when inside the elevator
- the display is formed as part of the landing door(s), viewable when waiting for an elevator
- when the display is formed on the landing door panels, we may offer 2 images: looking through the building (e.g. real time at the level of landing stop) or looking along the elevator ride, synchronized with selected elevator car's current position (this indicates how far from the landing the car is now, when it will arrive etc.)
- the elevator doors and/or landing doors include large, flat panel displays, such as OLED or LCD.
- the landing door frame or nearby structures includes projector(s) which project the photo-realistic model onto the landing doors, viewable when waiting for an elevator
- the elevator includes projector(s) which project the photo-realistic model onto the elevator doors, viewable when inside the elevator.

Optional Features Relevant to all Concepts A-G Above
- A display can show the photo-realistic 3D model of the scene from a viewing position not occupied by any specific camera
- A display can show the photo-realistic 3D model of the scene moving between viewing positions not occupied by any specific camera
- Viewing position is set automatically depending on viewer's location, including height above ground
- Display is a display in an elevator in a building and the cameras are placed to provide a view from that building
- Display is a display on or near the doors of an elevator, and shows the view of the 3D model from the height at which the elevator is currently at.
- Display is a display in an elevator in a building and the cameras are placed anywhere in the world to provide real-time changing views from a different building, anywhere in the world, at the same height above ground as the elevator, as it moves up or down.
- Viewing position is set manually by a viewer, such as by selecting a view from a viewer-selected location, and the viewer can then alter the direction (e.g. compass heading) from which the scene is viewed.
- Viewing position is set manually by a viewer, such as by selecting a view from a viewer-selected location, and the viewer can then alter the height above ground that the scene is viewed from.
- Display is a display on or near the doors of an elevator, and shows the view of the 3D model from the height at which the elevator is currently at.
- Viewing position is independent of viewer's location
- Cameras are vertically aligned
- Cameras are horizontally aligned
- Cameras are arranged in a matrix
- Video feed deliver high dynamic range images
- Cameras are fixed to a building and point out to the environment around the building
- Any arbitrary number of cameras can be used
- Cameras can be in any number of different locations, such as in different cities and countries
- Cameras are fixed inside a building and point to the environment inside the building
- Cameras are fixed to a vehicle and point out to the environment around the vehicle
- Cameras are fixed to a wearable computing device and point out to the environment around the person wearing the device
- Virtual images, such as signage, are added to the 3D model
- Elevator displays could be used for any informational purpose, not only, or even, for the photo-realistic 3D model
- A depth scanner in the elevator (e.g. lidar, IR mapping, stereo camera) detects the presence of a single person traveling within the elevator and the system then works out their point of view and makes corresponding corrections to the picture perspective/parallax for the photo-realistic 3D model.

The invention claimed is:

1. A method of showing a scene viewed by multiple digital cameras, comprising the steps of:
(a) some of the cameras viewing different parts of that scene;
(b) one or more video feeds from some or all of the cameras being processed at a computer to generate a photo-realistic 3D model of the scene, that photo-realistic model being viewable on one or more displays; in which the 3D model shows part of the scene in real-time, and other parts of the scene are computer-generated images from a historical view, and in which the computer is programmed such that
(c) the 3D model combines both static elements that do not alter in real-time, and also dynamic elements that do alter in real-time or near real-time;
(d) in which the one or more displays are in a lift or elevator and as the lift or elevator moves, then the computer generated view on the one or more displays moves forward in time, as the lift or elevator ascends or descends.

2. The method of claim 1 in which the computer can selectively turn-on dynamic modeling of specific portions of the scene.

3. The method of claim 1 in which a motion detection algorithm running on the computer can determine if a specific portion of the scene is changing and hence requires dynamic modeling.

4. The method of claim 1 in which the static elements are processed off-line whereas the dynamic elements are processed in real-time.

5. The method of claim 1 in which the computer controls the parameters or settings on multiple cameras, so that the 3D model can seamlessly present the view from those multiple cameras.

6. The method of preceding claim 5 in which the parameters or settings are synchronized or made equal at levels that the computer determines is optimal.

7. The method of claim 5 in which the parameters or settings are varied to levels that the computer determines is optimal to ensure that no areas are under or over-exposed.

8. The method of claim 1 in which the image feed from several cameras is processed by the computer to generate a texture for a specific surface or object in the scene.

9. The method of claim 1 in which effects associated with real-time weather conditions are added to the 3D model by the computer.

10. The method of claim 1 in which the historical view alters as a location of the one or more displays alters.

11. The method of claim 1 in which the view at the top of the lift's or the elevator's position corresponds to a contemporary real-time view.

12. The method of claim 1 in which the view at the top of the lift's or the elevator's position corresponds not to a contemporary real-time view, but to a view from a number of years previously.

13. A method of showing a scene viewed by multiple digital cameras, comprising the steps of:
    (a) some of the cameras viewing different parts of that scene;
    (b) one or more video feeds from some or all of the cameras being processed at a computer to generate a photo-realistic 3D model of the scene, that photo-realistic model being viewable on one or more displays; and in which the computer is programmed such that
    (c) the 3D model combines both static elements that do not alter in real-time, and also dynamic elements that do alter in real-time or near real-time, in which an elevator system includes one or more of the displays showing the photo-realistic model, in which the one or more displays are formed as part of a landing door or of landing doors, viewable when waiting for an elevator car, in which the one or more displays are formed on landing door panels, and the one or more displays provide two computer generated views: (i) looking through a building hosting the elevator system, and (ii) looking along the elevator ride, synchronized with the elevator car's current position.

14. The method of claim 13 in which the elevator system landing doors include flat panel displays.

15. The method of claim 1 in which the one or more displays are in an elevator in a building and the cameras are placed to provide a view from that building.

16. A method of showing a scene viewed by multiple digital cameras, comprising the steps of:
    (a) some of the cameras viewing different parts of that scene;
    (b) one or more video feeds from some or all of the cameras being processed at a computer to generate a photo-realistic 3D model of the scene, that photo-realistic model being viewable on one or more displays; and in which the computer is programmed such that
    (c) the 3D model combines both static elements that do not alter in real-time, and also dynamic elements that do alter in real-time or near real-time, in which the one or more displays are in an elevator in a building and the cameras are placed anywhere in the world to provide real-time computer generated changing views on the one or more displays from a different building, anywhere in the world, at the same height above ground as the elevator, as it moves up or down.

17. The method of claim 1 in which a viewing position is set manually by a viewer, and the viewer can then alter a direction from which the scene is viewed.

18. The method of claim 1 in which at least some of the cameras are fixed to a building and point out to the environment around the building.

19. The method of claim 1 in which a depth scanner in the lift or the elevator detects the presence of a single person traveling within the elevator and the computer then works out their point of view and makes corresponding corrections to the picture perspective/parallax for the photo-realistic 3D model.

20. A system including a computer and a lift or elevator including a display showing images generated by showing a scene viewed by multiple digital cameras, in which:
    (a) some of the cameras view different parts of that scene;
    (b) one or more video feeds from some or all of the cameras are processed at the computer to generate a photo-realistic 3D model of the scene, that photo-realistic model being viewable on the display; in which the 3D model shows part of the scene in real-time, and other parts of the scene are computer-generated images from a historical view, and in which the computer is programmed such that
    (c) the 3D model combines both static elements that do not alter in real-time, and also dynamic elements that do alter in real-time or near real-time, and
    (d) in which as the lift or elevator moves, then the computer generated view on the display moves forward in time, as the lift or elevator ascends or descends.

21. A system including a computer and elevator landing doors including one or more displays showing images generated by showing a scene viewed by multiple digital cameras, in which:
    (a) some of the cameras view different parts of that scene;
    (b) one or more video feeds from some or all of the cameras are processed at the computer to generate a photo-realistic 3D model of the scene, that photo-realistic model being viewable on the one or more displays; and in which the computer is programmed such that
    (c) the 3D model combines both static elements that do not alter in real-time, and also dynamic elements that do alter in real-time or near real-time, in which the one or more displays are viewable when waiting for an elevator car, in which the one or more displays are formed on landing door panels, and the one or more displays provide two computer generated views: (i) looking through a building hosting the landing door panels, and (ii) looking along the elevator ride, synchronized with the elevator car's current position.

22. A system including a computer and an elevator including a display showing images generated by showing a scene viewed by multiple digital cameras, in which:
    (a) some of the cameras view different parts of that scene;
    (b) one or more video feeds from some or all of the cameras are processed at the computer to generate a photo-realistic 3D model of the scene, that photo-realistic model being viewable on the display; and in which the computer is programmed such that
    (c) the 3D model combines both static elements that do not alter in real-time, and also dynamic elements that do alter in real-time or near real-time, in which the display is a display in the elevator in a building and the cameras are placed anywhere in the world to provide real-time computer generated changing views on the display from a different building, anywhere in the world, at the same height above ground as the elevator, as it moves up or down.

* * * * *